April 12, 1960 W. L. ADAMS ET AL 2,932,690

APPARATUS FOR IMAGE REPRODUCTION

Filed Sept. 21, 1956 3 Sheets-Sheet 1

INVENTORS
WILLIAM L. ADAMS
THOMAS F. JONES, JR.
BY
Wallace and Cannon
Atty's.

INVENTORS
WILLIAM L. ADAMS
THOMAS F. JONES, JR.
BY
Wallace and Cannon
Atty's.

INVENTORS
WILLIAM L. ADAMS
THOMAS F. JONES, JR.
BY
Wallace and Cannon
Att'y's.

2,932,690

APPARATUS FOR IMAGE REPRODUCTION

William L. Adams, Arlington, and Thomas F. Jones, Jr., Squantum, Mass., assignors to Addressograph-Multigraph Corporation, Cleveland, Ohio, a corporation of Delaware Application September 21, 1956, Serial No. 611,287

10 Claims. (Cl. 178—6.6)

This invention relates to a new and improved method of reproducing images and to apparatus for carrying out that method as a continuous process. More particularly, the invention relates to an image-reproduction method suitable for printing address labels, bills, other business instruments, and other applications requiring extremely high speed reproduction, particularly where the material to be reproduced is non-repetitive in nature.

Population increases and the ever-spreading use of the printed word to disseminate information, sell goods, collect charges, and perform other functions has led to the creation of tremendous address lists which must be utilized periodically in addressing magazines, printing bills, checks, and other business instruments and the like. This development has been accompanied by an ever-increasing demand for higher speeds in the printing or other reproduction devices utilized for this purpose. At present, one of the most satisfactory systems entails maintenance of a record card carrying the complete information necessary for each business instrument to be printed. These record cards may carry some information in the form of punched holes or other similar indicia; in addition, some of the information on the cards may be in the form of printed matter. In printing address labels or other instruments from these cards, the printed material may be anlyzed by an electro-optical scanning system and then reproduced on a strip of paper by a facsimile reproduction device; one widely used system of this general type is described in Patent No. 2,510,200 issued June 6, 1950, in the name of R. G. Thompson. This and other similar facsimile systems have thus far met the demands for increasing speed, but it now appears that in at least some instances they will be unable to meet future requirements without requiring an excessive capital investment for the equipment required. In particular, systems of the type described in the Thompson patent, which utilize mechanical vibrators in the reproducing portion of the facsimile system, do not appear well suited to the extremely high speed reproduction desirable in at least some present and/or forseeable business printing apparatus.

Another type of reproduction system which has been proposed for non-repetitive high speed applications is based upon the principle of electrostatic photography, sometimes referred to as xerography. In an arrangement of this type, a light image of the material to be reproduced is focused upon a drum or similar member which carries a surface coating of selenium or other photo-conductive material. This projected image is utilized to discharge selected portions of the photoconductor, which has previously been charged to a predetermined electrostatic potential, thereby forming an electrical image on the printing drum. This electrical image is then dusted with electroscopic powder or otherwise developed to form on the drum a physical image corresponding to the material to be reproduced. The powder image is transferred by electrostatic attraction, pressure, heating, or other techniques to a paper web and is then fixed or made permanent on the paper web by one of a number of known image-fixing procedures. By way of example, in at least one proposed process the powder image is transferred to a paper web by electrostatic attraction and then fused to the web by heating.

These known electrostatic image techniques appear to be capable of operation at somewhat higher speeds than the more conventional mechanical reproduction methods. At the same time, however, they are relatively expensive and require several sequential stages of processing all of which afford a possibility that the equipment will fail to function properly. In addition, special techniques must be adopted to avoid abrasion or other deterioration of the selenium surface usually used as the photoconductor in the process and, of course, the photoconductor must be protected from extraneous illumination during operation in order to function properly.

A somewhat more direct approach to the problem of electrostatic reproduction has been presented in which a web of paper is moved through a printing space intermediate a charging electrode and a source of charged developer particles. In this proposal, an electrical field of variable intensity is developed between the charging electrode on one side of the paper and the source of charged particles on the other side of the paper; the strength of this field is modulated by an image signal to form the desired image directly upon the paper web by selectively attracting or repelling the charged particles with respect to the paper web. This process, although attractive from the standpoint of simplicity and reduced number of processing steps, is rather difficult to carry out in a practical high speed printer because of the necessity for effectively scanning the paper web in a transverse direction as it moves past the particle generator. Moreover, the electrical field which is utilized to attract the particles to the paper web may tend to spread somewhat, leading to a loss of definition in the reproduced image.

It is an object of the invention, therefore, to provide a new and improved high speed image reproduction method which substantially eliminates or minimizes the aforementioned disadvantages of known processes.

It is another object of the invention to provide a new and improved electrostatic reproduction method which is greatly simplified in comparison with xerographic techniques but which provides clean relatively sharp reproduction suitable for business purposes.

A more specific object of the invention is the formulation of a new and improved method of image reproduction suitable for high-speed non-repetitive applications in which the image is formed and developed directly upon a web of paper or other similar image-receiving material.

A corollary object of the invention is the provision of a new and improved method of image reproduction which is relatively economical in operation and which affords a minimum of possible sources of malfunction.

It is a further and important object of the invention to provide a new and improved continuous direct-acting apparatus for the electrostatic reproduction of images.

Another object of the invention is the provision of a new and improved scanning device suitable for use in a high speed electrostatic reproduction process.

In one aspect, therefore, the invention is directed to a method of reproducing an image and comprises the following steps: A sheet of dielectric material, usually paper, is scanned from one selected side with an image electrode in accordance with a preselected scanning pattern. The image electrode may be in contact with the dielectric sheet or may be spaced therefrom by a relatively small distance. The image electrode is energized with an image signal of predetermined polarity during the scanning to induce on the selected surface of dielectric an electrostatic charge image corresponding to the image to be reproduced. Simultaneously, the same dielectric surface is flooded with developer particles in the region immediately adjacent the image electrode to form on that dielectric surface a physical image representative of the charge image; thus, the physical image is formed substantially simultaneously with the electrical charge image. In most instances, it is desirable to fix the image to the dielectric at a subsequent stage of the process by application of heat, pressure, or other similar techniques.

In another aspect, the invention relates to a continuous direct-acting apparatus for the electrostatic reproduction of images. Apparatus of this type constructed in accordance with the invention comprises a rotatable electrically conductive drum or cylinder which may in some instances be provided with a dielectric coating upon its external surface. Means are provided for rotating the drum at a predetermined speed and for maintaining the drum at a predetermined electrical potential. Further means are included in the apparatus to bring a paper web into contact with the external surface of the drum so that the paper web is moved along with the drum. An image electrode is movably mounted adjacent the exposed surface of the paper web opposite the drum and is utilized to scan the web in accordance with a preselected pattern. This image electrode is coupled to a signal source which is employed for selectively energizing the image electrode to a given polarity in accordance with the image values in an image to be reproduced, thereby establishing a charge image on the paper web. In a typical instance, this signal source may comprise a facsimile scanning device of the type described in the aforementioned Thompson patent. The inventive apparatus further includes means for flooding the exposed surface of the paper web with developer particles in the region immediately adjacent the image electrode to form on the paper web a physical image representative of the electrostatic charge image; thus, the physical image is formed substantially simultaneously with the charge image.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

Figure 1:
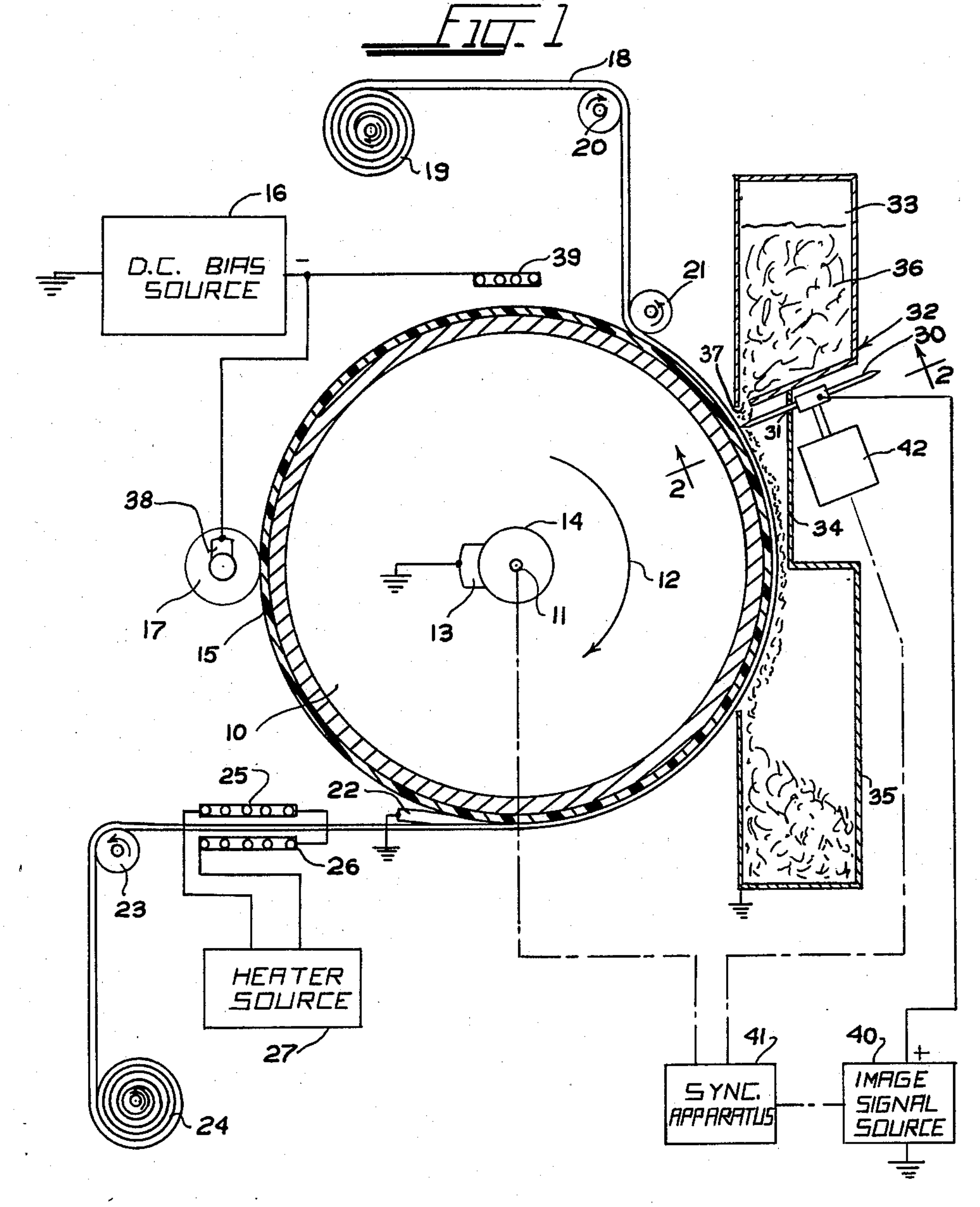
Fig. 1 is a conventionalized elevation view, partly in cross section, of one form of apparatus constructed in accordance with the invention and adapted to carry out the inventive method.

The apparatus illustrated in Fig. 1, which is constructed in accordance with one embodiment of the invention and is adapted to carry out the inventive method as a continuous process, comprises a conductive printing member 10 here shown as a metal drum or cylinder mounted for rotation about a central axis 11 in the direction indicated by arrow 12. Suitable means are provided for maintaining conductive cylinder 10 at a predetermined electrical potential; in this instance, this means comprises a brush or similar device 13 which makes electrical contact with the hub 14 of the drum. In the illustrated embodiment, conductive drum 10 is grounded through brush 13. The external surface of printing member 10 is coated with a layer of dielectric material 15. The particular dielectric selected for the apparatus is not critical; the dielectric may comprise polystyrene, glass, or any one of a wide variety of resins and other dielectric materials.

The printing apparatus of Fig. 1 further includes a low voltage D.C. source 16 which is connected to a conductive roller 17 in contact with the exposed dielectric-coated surface of printing member 10. A web 18 of dielectric material, usually paper, is extended from a supply roll 19 over guide rollers 20 and 21 into contact with a portion of the exposed surface of dielectric layer 15. A blade 22 is utilized to separate web 18 from the drum at a location spaced around the drum from roller 21 and the web subsequently passes over a further guide roller 23 to a storage roll 24. A pair of heater coils 25 and 26 are positioned on opposite sides of the paper web in position to heat the web after it has been separated from printing member 10. The electrical heating coils 25 and 26 are energized from a suitable A.C. or D.C. source of electrical energy as indicated at 27.

An image electrode 30 is included in the apparatus of Fig. 1 and is located closely adjacent the exposed surface of web 18 at a point intermediate guide roller 21 and blade 22 on drum 10. As will be explained more completely hereinafter, image electrode 30 may be in contact with the exposed surface of web 18 or may be spaced from the paper web by a relatively short distance. Electrode 30 extends through an opening 31 in the wall of a developer housing generally indicated at 32. The developer housing 32 includes three principal sections, a feed hopper section 33, a developing chamber 34, and a receiving or terminal chamber 35. Hopper 33 is filled with a developer power 36 which may be discharged from the hopper through an opening 37 into contact with the exposed surface of paper web 18 in the portion of developer chamber 34 immediately adjacent image electrode 30. Hopper section 33 may be formed from conductive material and preferably is electrically grounded.

Image electrode 30 is electrically coupled to an image signal source 40 which may, for example, comprise a facsimile transmitting station of the type described in the aforementioned Thompson patent or may comprise any other suitable source of facsimile image signals. Image signal source 40 is controlled by a synchronizing apparatus 41 which is also coupled to printing member 10 and to a traversing mechanism 42 for image electrode 30. In a typical system, in which image analysis and printing are carried out at a single location, synchronizing apparatus 41 may comprise a constant-speed electrical motor employed to drive the image cylinder or helically-apertured analyzing cylinder of the facsimile transmitter 40 along with such other apparatus as may be provided for scanning an image at the transmitter 40. In a system similar to that of the Thompson patent, in which a record card is advanced at a predetermined speed past a rotating, helically-apertured cylinder for analysis, synchronizing apparatus, 41 would include the driving mechanism for both the card-advancing apparatus and the apertured-cylinder rotating device. In such an arrangement, synchronizing apparatus 41 may be mechanically connected to drum 10 to rotate the drum at a speed such that its peripheral velocity is approximately equal to or otherwise related to the speed of card advance at the transmitting station. Moreover, the image electrode traversing mechanism 42 may comprise a gear box or other similar speed-control mechanism mechanically connected to the rotating drive for facsimile transmitter 40. Both printing member 10 and image electrode 30 are preferably driven at speeds directly related to the operating speeds of the facsimile transmitter.

Figure 2:
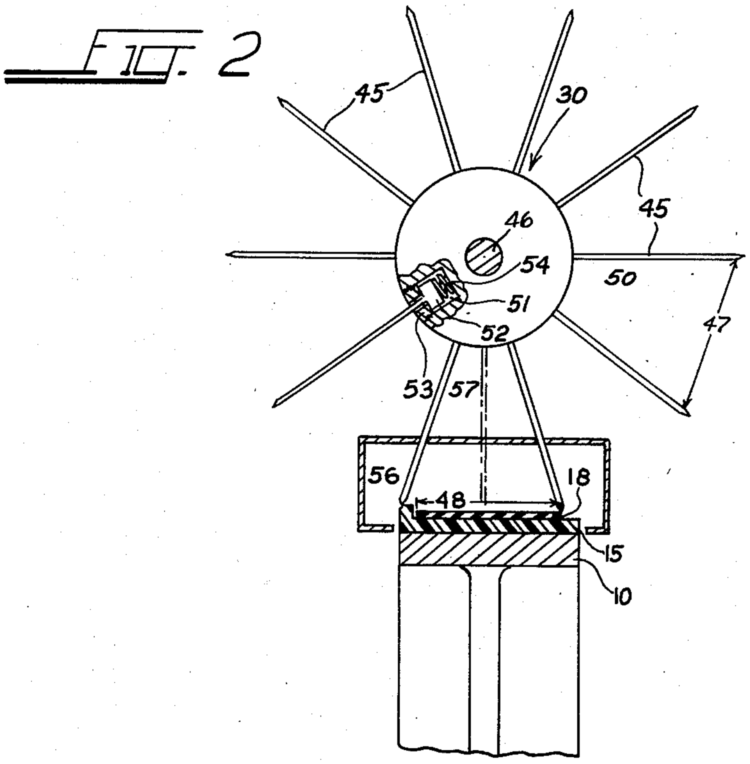
Fig. 2 is an enlarged view of a portion of the apparatus of Fig. 1 taken along line 2—2 therein.

Image electrode 30 is shown in enlarged detail in Fig. 2, which also illustrates printing member 10 in substantially enlarged cross-sectional detail. As shown in this figure, image electrode 30 includes a plurality of conductive elements 45 mounted for rotation about a common axis 46. The peripheral spacing 47 between elements 45 is made approximately equal to the width 48 of paper web 18; consequently, as image electrode 30 is rotated the individual conductive elements or styli 45 sequentially scan paper web 18, which is continuously advanced in a direction perpendicular to the plane of the drawing to establish a regular scanning pattern. In the illustrated embodiment, image electrode 30 includes ten styli 45; the number of conductive elements may, however, be varied substantially without departing from the invention, as will become more apparent from further explanation of the inventive process.

A portion of the central hub 50 of image electrode 30 is broken away in Fig. 2 to show one suitable mounting arrangement which may be employed for styli 45. Each of the styli or probes 45 is slidably mounted within an opening 51 in hub 50, the latter element being formed from electrically conductive material. A shoulder 52 on the probe engages an extension portion 53 of the hub to limit radial movement of the probe, which is biased radially outwardly from axis 46 of the electrode by a spring element 54. Each of spring members 54 is fabricated from conductive material so that all of the probes 45 are electrically connected to hub 50 of the image electrode and thus to each other. Hub 50, in turn, is electrically connected to image signal source 40 as indicated in Fig. 1; a spring contact or similar arrangement (not shown) may be employed for this purpose.

The inventive method, as carried out by the apparatus of Figs. 1 and 2, is a continuous non-repetitive direct-acting electrostatic image reproduction procedure although the method may also be embodied in a non-continuous printing procedure. Synchronizing apparatus 41 is suitably energized and initiates rotation of printing member 10 and image electrode 30 at speeds suitably related to the corresponding scanning speeds employed at image signal source 40. The print-receiving dielectric web 18 is then brought into contact with dielectric coating 15. Continuing rotation of printing member 10 brings the surface-charged paper web 18 into the printing zone generally defined by section 34 of developer apparatus 32. Electrode 30 is energized with the facsimile or image signal from source 40; as the paper web passes beneath electrode 30, the signal-modulated electrical field between electrode 30 and printing drum 10 charges selected areas of the dielectric 15, 18 and induces on the exposed surface of the paper an electrostatic charge image of the same polarity as the signal from source 40. In the illustrated embodiment, the charge image is positive in polarity. Simultaneously, the paper web is flooded with developer particles 36 from hopper section 33 in the region adjacent image electrode 30. Consequently, as the charge image is formed on the paper surface, a physical image representative of the charge image is formed on the paper web substantially simultaneously with formation of the charge image. Web 18 continues through the fixing zone established by heater elements 25 and 26 to storage roll 24. Any excess developer particles which do not adhere to the charge image fall into receiving hopper 35. A suitable return conveyor or similar mechanism may of course be provided to transfer the unused or excess developer material from receiving chamber 35 to discharge hopper 33. Continued rotation of drum 10 brings the dielectric layer 15 into contact with conductive roller 17, which effectively removes any latent charge image remaining on the surface of the dielectric. The conductive roller may be grounded, but preferably is connected to a low-voltage D.C. source of opposite polarity to image source 40 to establish a bias voltage on the dielectric layer.

In order fully to appreciate the inherent flexibility and substantial operating advantages offered by the inventive method and by the apparatus illustrated in Figs. 1 and 2, it is desirable to consider the several stages of this embodiment of the invention individually. In this particular embodiment, insofar as printing of an individual address or other piece of information is concerned, the first step of the inventive method is the charging of dielectric coating 15 and web 18 with the desired electrostatic image. This primary stage in the process is best understood by reference to Fig. 2. As indicated therein, image electrode 30 is rotated at a predetermined speed to traverse probes 45 across the surface of paper web 18 in sequence, thereby scanning the paper web in accordance with a preselected scanning pattern. It is not necessary that probes 45 make physical contact with the exposed surface of paper web 18; rather, they may be spaced from the paper web by a relatively small distance. From the standpoint of signal amplitude requirements, however, it is preferable to have styli 45 make direct contact with the paper as indicated in Fig. 2. Under these circumstances, dielectric coating 15 may be provided with a relatively small lip or shoulder 56 to absorb the initial mechanical shock of contact with each probe and to prevent the probes from tearing the paper. As each probe traverses the paper, it is urged inwardly against the bias provided by spring contact 54, maintaining constant contact across the complete width of the paper. Once the probe has passed the dead center location indicated in dash lines at 57, of course, the biasing force provided by spring contact 54 urges the probe outwardly to maintain the desired physical contact. It will be appreciated that the biasing force provided by contact 54 should be relatively small, since otherwise the probes might tend to cut and tear the paper web; indeed, other electrical contact arrangements which do not exert a biasing force may be utilized in which case the centrifugal force exerted upon the probes by the rotational movement of image electrode 30 may be sufficient to maintain the desired contact between the styli and the paper. It should be understood that the image electrode construction illustrated in Fig. 2 is exemplary only, although it represents a highly effective and useful scanning device for use in conjunction with the inventive method. Other rotary or reciprocating mechanisms for traversing paper web 18 with a conductive stylus or probe may be substituted for the apparatus of Fig. 2 without departing from the inventive method concept.

As the styli of image electrode 30 traverse the exposed surface of paper web 18, they are energized with a facsimile signal which effectively charges selected portions of the surface of the paper web and dielectric 15 to the desired polarity. Thus, scansion of the paper web by the image electrode induces on the paper surface an electrostatic charge image corresponding to the image to be reproduced. As this image is formed, however, it is immediately developed into a physical image by virtue of the flooding of the image area with developer particles discharged from hopper section 33 through opening 37. This portion of the inventive method is subject to wide variation insofar as the nature of the developer material is concerned. For example, developer particles 36 may comprise an electroscopic powder charged to a negative potential. Preferably, however, developer 36 comprises any of the commercially available developer compositions currently employed in the field of xerography; these compositions usually include a granular carrier material mixed with a developer powder which is triboelectrically related to the carrier particle material in such a manner that the developer powder effectively adheres to the carrier granules and receives an electrical charge of predetermined polarity. These commercial developers for xerographic prints may be purchased from several sources, including The Haloid Company, Dayton, Ohio, and Radio Corporation of America, Camden, New Jersey. The developers which are at present available through commercial channels usually are negatively charged; that is, the developer powder adheres to a positive charge image. Moreover, the developer material need not be solid in form; the developer particles may comprise a fine liquid mist, the individual particles of which have been charged to the opposite polarity from the electrostatic image applied to the paper web by electrode structure 30.

Because the charged developer particles flood the area immediately adjacent image electrode 30, the charge image induced upon the paper by the image electrode is physically developed substantially simultaneously with its formation. This is of extreme importance in relation to the inventive concept. Most paper which is economically suitable for address labels and other business instruments is not a particularly good dielectric and tends to dissipate the charge pattern fairly rapidly. Simultaneous formation of the electrostatic and physical images avoids any necessity for specially prepared papers and at the same time effectively eliminates the loss of definition which would occur if a conventional and economically advantageous paper web were utilized to store the charge image for any appreciable period. It might be expected that the described simultaneous operation would come to grief rapidly by attraction of and adherence of the electrically charged developer particles to image electrode 30. This expected difficulty however, does not occur. The rapid movement of the image electrode through the cloud or flood of developer particles will prevent their adherence to the charging electrode, so that this electrode does not become coated with the developer particles. Consequently, no difficulty from this source is actually experienced in the inventive method.

Fixation of the image on the paper web is to a considerable extent determined by the nature of the developer employed for the image. Many of the commercially available developers comprise thermo-adhesive or other heat-sensitive materials which may be heated as indicated by elements 25 and 26 to form a permanent image on the paper. In other instances, as when a liquid mist is utilized to develop the image, other fixation techniques may be employed. For example, if a liquid developer is utilized, the paper web may be passed through a zone in which it is contacted with a dye that is soluble in the developer to form the desired permanent image on the paper web. Then again, the paper web may be treated with a chemical agent which does not substantially effect the appearance of the paper but which reacts with the developer, be it powder or liquid, to form a relatively permanent image. Any of these development techniques, examples of which are all known in the art, may be employed in conjunction with the invention without departing therefrom.

After the paper web 18 has been separated from drum 10, as indicated by blade 22, continued rotation of the drum brings the dielectric layer 15 into contact with conductive roller 17. At the time of image formation, the dielectric layer 15, as well as paper web 18, is charged positively in accordance with the desired image. The charge image dissipates to a substantial extent before reaching the conductive roller but may remain on the dielectric to some extent. Consequently, in order to avoid blurring and other undesirable effects due to presence of this remaining image, the conductive roller is utilized to discharge the electrostatic image completely and thus in effect electrostatically "clean" the surface of dielectric layer 15. The same effect may be achieved to at least a substantial extent by electrically grounding blade 22, as indicated in the drawing, but the roller arrangement is preferable in that it assures better contact with the entire surface of the dielectric layer.

The discharge of the undesired remaining electrostatic charge upon layer 15 may be achieved simply by grounding the brush or similar contact device 38 connected to roller 17. Preferably, however, the roller is established at a relatively low negative potential and consequently establishes a uniform negative bias potential upon the dielectric surface. This negative bias charge serves as a positive protection against any background or stray charge which might otherwise develop on the dielectric coating when the apparatus is in constant and relatively high speed use. This effect may also be achieved by other means; for example, a charging grid 39 may be utilized instead of the conductive roller 17 or as an auxiliary thereto. Grid 39 may, for example, comprise a plurality of relatively fine conductive elements or wires extending transversely of the external surface of drum 10 and may be utilized to establish a uniform electrostatic potential upon the dielectric surface by maintaining the grid at a substantial negative potential with respect to drum 10. Grid 39 may be located in contact with the surface of the printing drum but preferably is spaced therefrom by a relatively small distance. Consequently, it may be desirable to operate the grid structure, when substituted for the conductive roller, at a somewhat higher potential than necessary for the roller arrangement. The desired negative bias on conductive layer 15, whether established by roller 17 or grid 39, is preferably of the order of 200 volts or less, although this potential may be varied over a relatively wide range. The bias applied to the dielectric layer is also useful in that it is reflected through the relatively poor dielectric of paper web 18 and consequently tends to repel the developer particles from the paper apart from the desired electrostatic image.

Figure 3:
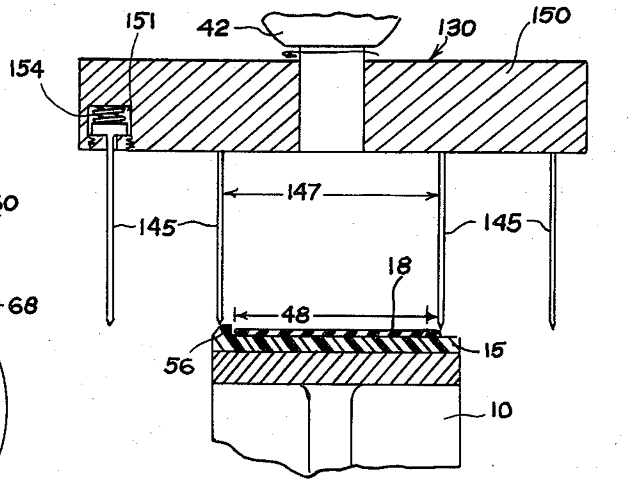
Fig. 3 is an enlarged sectional view of an alternative form of the electrode structure of Fig. 2.

Fig. 3 illustrates a different electrode structure which may be utilized instead of electrode structure 30; the electrode structure 130 shown in this figure is like the previously described device in that it comprises a conductive hub 150 driven from the traversing or driving mechanism 42. Hub 150 is oriented differently with respect to drum 10 than is the conductive hub in the previously described arrangement, however, being arranged with the face of the hub in a plane substantially parallel to the surface of the drum rather than normal thereto. A plurality of individual charging electrodes or styli 145 are arranged about the periphery of hub 150 in a repetitive pattern, the spacing 147 between adjacent styli being approximately equal to the width 48 of the paper web 18. As in the previous embodiment, the dielectric layer 15 on the surface of drum 10 is preferably provided with a shoulder 56 which absorbs the initial shock incident to contact of the styli 145 with the rotating drum, thereby preventing tearing of the paper web.

As indicated in Fig. 3, the styli 145 may be resiliently mounted within individual wells 151 in the conductive hub 150 to compensate for irregularities in paper thickness and to assure good contact between the styli and the paper as hub 150 is rotated to traverse the styli across the paper web. Moreover, provision is made for maintaining good electrical contact between hub 150 and the styli as indicated by the provision of electrically conductive biasing springs 154.

The principal advantage of the electrode structure illustrated in Fig. 3 as compared with that of Fig. 2 derives from the fact that the paper-contacting extremities of the individual probes or styli are maintained approximately equidistant from hub 150 during operation of the device, thereby substantially minimizing the possibility of damage to the paper web. The scanning lines produced by relative movement of the electrode structure 130 with respect to the paper web are arcuate in configuration rather than linear as in the embodiment of Fig. 2. The degree of curvature of the lines, however, may be made relatively small provided the diameter of the electrode structure is relatively large in comparison with the width of the paper web. Consequently, and particularly in the printing of address labels or similar matter, this attribute of the electrode structure 130 is of negligible effect with respect to the overall appearance of the reproduced image. It will of course be understood that the electrode structure shown in Fig. 3 is merely illustrative of several different mechanical arrangements of this general type which may be utilized in the inventive system, although it represents a preferred electrode construction. For example, it is not essential that the styli be resiliently mounted in the conductive hub. Accordingly, the electrode structure may take the form of a plurality of substantially L-shaped styli extending radially from a relatively narrow central hub to afford a contact configuration essentially similar to that of Fig. 3.

Other possible modifications of the method and apparatus illustrated in Figs. 1–3 will be immediately apparent to those skilled in the art. For example, in some applications it may be desirable to charge the dielectric layer 15 to a relatively high negative potential before it enters the image development area, in distinction to the relatively low-voltage bias arrangement described hereinabove. Thus, if the D.C. bias source 16 is operated at a potential of the order of 1 to 10 kilovolts, a corona discharge may be established between charging grid 39 and printing member 10 to charge the dielectric surface 15 to a relatively high negative potential. When this is done, the uniform electrostatic charge applied to the dielectric layer is effectively conducted through the paper web to its outer surface, due to the low resistivity of the paper. This surface charge on the paper is selectively discharged by the positive image signals applied to electrode 30 (or electrode 130) to form the desired electrostatic image and the image is developed in exactly the same manner as described hereinabove. Image fixation is of course unchanged by this modification of the system and is accomplished in a manner determined by the nature of the developer employed. In this modified arrangement, as indeed in that described above in connection with Figs. 1–3, the dielectric layer 15 on printing drum 10 is provided principally to protect the printing system in the event of electrical breakdown of the paper and to avoid any possible damage which might otherwise result from this source. Moreover, it should be appreciated that in all of the arrangements set forth herein, the selection of polarities is determined primarily by the nature of the developer material and the characteristic charge polarity to which the developer is attracted; thus, for example, the signal and bias polarities in the embodiment of Fig. 1 may be reversed when using a developer material which is attracted to a negative rather than to a positive electrostatic charge.

Figure 4:
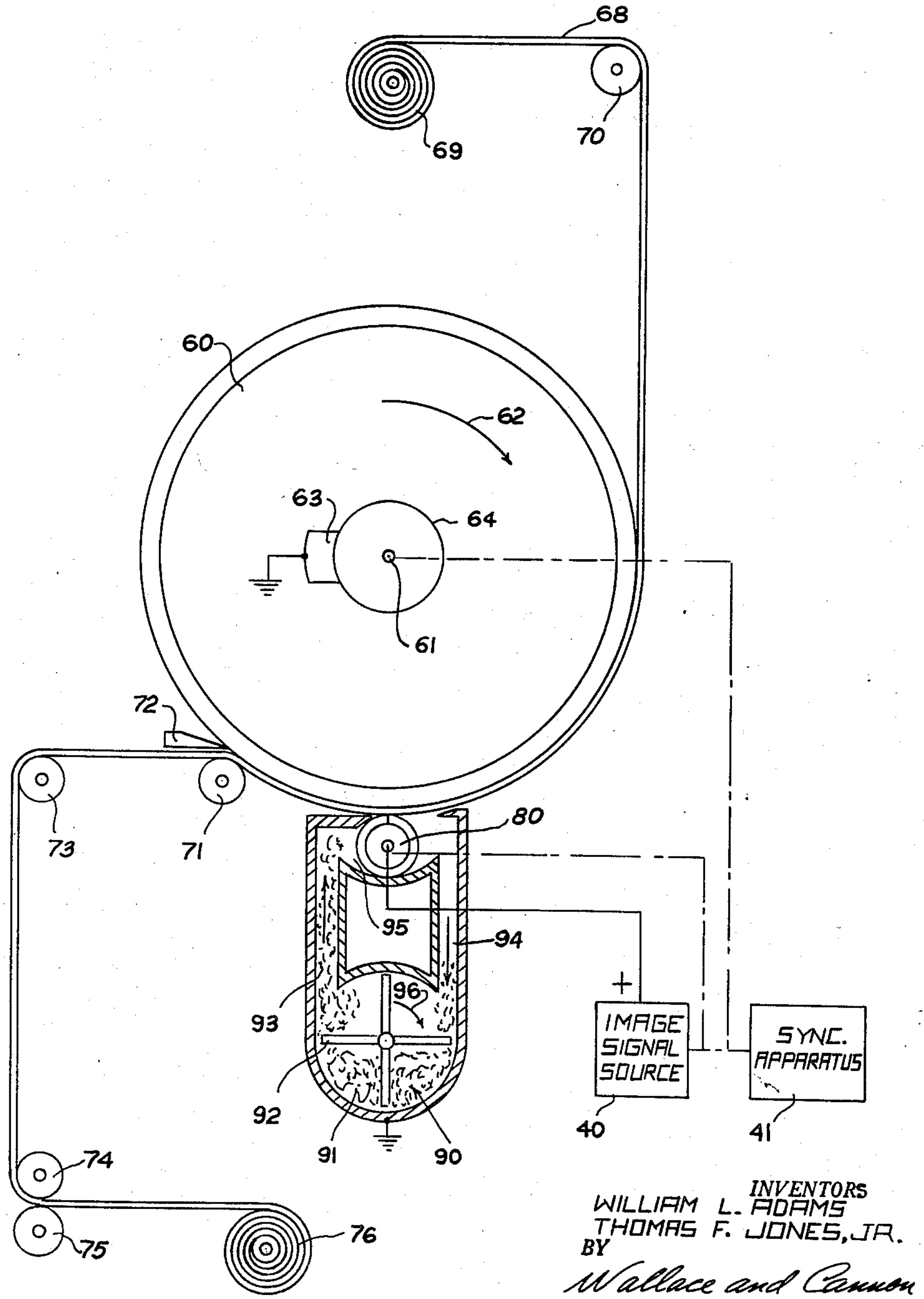
Fig. 4 is a conventionalized elevation view, partly in cross section, of another embodiment of apparatus constructed in accordance with the invention and adapted to carry out the inventive method.

Fig. 4 illustrates another embodiment of the apparatus aspect of the invention capable of carrying out the inventive method concept in the continuous reproduction of images by electrostatic means. The apparatus of Fig. 4 comprises a cylindrical metal drum or printing member 60 which is quite similar to printing member 10 of Fig. 1 except that in this instance the drum is not coated with a dielectric material; rather, the exposed surface of the printing member is conductive in nature. Drum 60 is mounted for rotation in the direction indicated by arrow 62, the axis of rotation of the drum being indicated at 61. As in the previous embodiment, the printing member includes a conductive hub or axle member 64 which is maintained in electrical contact with a brush or similar contact member 63. Preferably, brush 63 is grounded.

A web 68 of paper or similar print-receiving material is fed from a supply roll 69 over a guide roller 70 into contact with the exposed surface of conductive drum 60 and is maintained in contact with the drum, partly through electrostatic attraction and partly through the mechanical arrangement of the printing apparatus. Paper web 68 remains in contact with the drum through only a portion of its period of rotation and is separated from the drum by means comprising a second guide roller 71 and a blade 72. Thereafter, the paper web 68 is guided over a further guide roller 73 and between a pair of pressure rollers 74 and 75 to a storage roll 76. Pressure rollers 74 and 75 comprise the fixing device or mechanism of this particular embodiment of the invention, as will be described more completely hereinafter.

Figure 5:
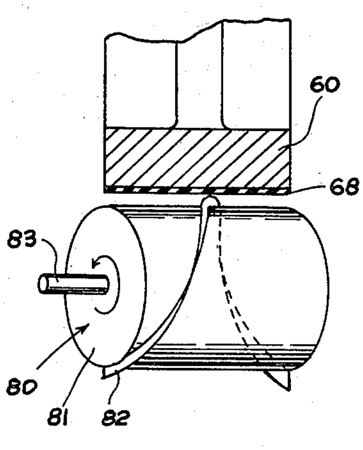
Fig. 5 is an enlarged view of a portion of the apparatus of Fig. 3.

The apparatus embodiment of Fig. 4 further includes an image electrode 80 which is maintained in contact with the exposed surface of paper web 68 at one point as the paper web is carried along in contact with printing members 60. Image electrode 80 is illustrated in enlarged detail in Fig. 5, and comprises a cylindrical member 81 upon which is mounted a conductive helical land or charging element 82. Cylinder 81 may be fabricated from conductive material to provide an electrical connection between charging land 82 and the shaft 83 of the image electrode; if preferred, however, the cylindrical member 81 may be formed from dielectric material. In the latter instance, means must be provided to establish an electrical connection to the helical land 82, either through an element interconnecting shaft 83 and land 82 or by other suitable means. As indicated in Fig. 4, helical land 82 makes a point contact with paper web 68. As cylinder 81 is rotated, therefore, the charge electrode effectively traverses paper web 68 in a direction normal to the direction of movement of the paper, which in this instance is perpendicular to the plane of the drawing. Consequently, the rotation of charging electrode 80 and the movement of paper web 68 with respect to the charging electrode cause the charging electrode to scan the surface of paper web 68 in a scanning pattern determined by the relative velocities of the paper and the charging electrode. The electrode structure of Fig. 5 is in this respect functionally equivalent to that described above in connection with Fig. 2.

The embodiment of Fig. 4, like that of Fig. 1, includes an image signal source 40 which may comprise a conventional facsimile transmitting apparatus and a synchronizing apparatus 41 utilized to control image signal source 40 and also to determine the speed of rotation of printing member 60 and image electrode 80. As in the previously described arrangement, synchronizing apparatus 41 may comprise the mechanism employed to advance record cards past an optical-electrical scanning station as well as the motor or other means employed to drive a helically slotted scanning cylinder at that scanning station; this being the case, image electrode 80 may be driven synchronously with the scanning cylinder at the transmitting station, whereas printing drum 60 may be driven at a rotational speed such that the peripheral velocity of the printing member is approximately equal to the speed of advance of the record cards through the facsimile scanning station.

The apparatus illustrated in Fig. 4 further includes a developer apparatus 90 comprising a developer receptacle 91, a rotary agitator and impeller 92, and a pair of connecting passageways 93 and 94 which are interconnected with each other by a development passageway 95 which substantially encompasses image electrode 80. Impeller 92 is rotated in the direction indicated by arrow 96 to drive particles of developer material through passageway 93 so that the developer particles flood the surface of paper web 68 in the region adjacent image electrode 80. Passageway 94 provides a return path for the developer particles, thus affording a substantially closed development system. In the illustrated apparatus, the developer apparatus is preferably grounded.

The inventive method, as carried out by the continuous direct-acting electrostatic reproduction apparatus of Fig. 4, is essentially similar to that set forth above in connection with Figs. 1 and 2. In this instance, the conductive printing member or drum 60 is maintained at a uniform potential by virtue of the grounding connection through brush 63. Accordingly, any electrostatic charge which may be present on paper web 68 is effectively discharged before the web reaches the image electrode 80, due to the relatively poor dielectric properties of the paper. As the paper web traverses the printing or deposition area in which it is contacted by image electrode 80, the paper is charged in selected areas determined by a positive potential applied to the image electrode from source 40 and by the position of helical land 82 (Fig. 5) with respect to the paper web, thus establishing a positive electrostatic charge image upon the paper web. As this image is formed, it is flooded with developer particles which are blown from chamber 91 by impeller 92 through passageway 93 and into the printing area chamber 95. The developer particles, as in the previous embodiment, are effectively triboelectrically charged to the opposite polarity; consequently, the developer is attracted to the charge image but is not attracted to other areas of the paper surface. As in the previous embodiment, development of the charge image into a physical image is thus accomplished virtually simultaneously with formation of the charge image itself. Subsequently, the image-bearing paper web is separated from drum 60 by blade 72 and is guided over rollers 71 and 73 to pass between pressure rollers 74 and 75. In this instance, the pressure rollers are utilized to fix the image into substantially permanent form on the paper web and are thus functionally substituted for the heat-fixation apparatus 25—26 of Fig. 1.

As in the embodiment of Fig. 1, the developer employed in this embodiment of the apparatus is subject to substantial variation without entailing any departure from the invention. An electroscopic powder many be utilized as the developing medium, preferably with a granular carrier to assist in conveying that powder to the surface of paper web 68 immediately adjacent image electrode 80. Alternatively, a liquid mist or any other suitable developer for an electrostatic image may be employed in conjunction with this embodiment of the inventive apparatus. As in the previous embodiment, the particular technique selected for fixing the image in permanent form upon the paper web is determined primarily by the type of developer selected to establish a physical image upon the paper surface. Thus, it will be understood that the pressure-fixation device 74, 75 of Fig. 3 may be freely substituted for the heating apparatus 25—27 of Fig. 1 and vice versa, depending upon the nature of the development material selected for use in the process. Unlike the multiple-stylus image electrode 30 of Figs. 1 and 2, however, the helical-land electrode 80 of Figs. 4 and 5 is not generally suitable for operation in a system in which the image electrode is maintained in spaced relationship with respect to the surface of the paper web; rather, the helical-land electrode should be maintained in contact with the paper web in order to obtain satisfactory results, since if field-discharge effects across an air gap are relied upon using image electrode 80 a substantial loss in definition will frequently occur.

The two embodiments of the invention set forth above, which are based upon a common method concept, provide substantial advantages in comparison with presently known electrostatic or other reproduction techniques suitable for use in the high speed non-repetitive applications currently prevalent in business operations. This method, and the systems described, retain the advantages of xerographic reproduction techniques and at the same time eliminate any necessity for transferring the image in either electrostatic or physical form from one surface to another, thereby materially reducing possible sources of malfunction of the printing system. Because all of the processing and printing stages of the inventive method are carried out from one side of the paper web, difficulties in maintaining accuracy in the electrostatic image and in handling of the paper web presented by previously known direct-acting electrostatic techniques are substantially minimized. The difficulties which would be expected to be encountered from the presence of particles charged to one polarity and an image electrode charged to the opposite polarity in the same printing area are not encountered; the image electrode does not accumulate deposits of the developer. The various forms of image electrode described and illustrated have been found most effective in carrying out the inventive method; these related electrode structures each permit scansion of the paper web in a regular preselected pattern which affords high definition and the necessary uniformity in the reproduced image.

Hence, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A continuous direct-acting apparatus for the electrostatic reproduction of images comprising: a rotatable electrically conductive drum; means for rotating said drum at a predetermined speed; means for maintaining said drum at a predetermined electrical potential; means for bringing a paper web into contact with the external surface of said drum for movement therewith; an image electrode movably mounted adjacent the exposed surface of said paper web for scanning said web in accordance with a preselected pattern; a signal source, coupled to said image electrode, for selectively energizing said image electrode to a given polarity in accordance with the image values in an image to be reproduced to establish a charge image on said paper web; and means for flooding the exposed surface of said paper web with developer particles in the region immediately adjacent said image electrode to form on said paper web a physical image representative of said charge image substantially simultaneously with formation of said charge image.

2. A continuous direct-acting apparatus for the electrostatic reproduction of images comprising: a rotatable electrically conductive drum having a dielectric-covered external surface; means for rotating said drum at a predetermined speed; means for charging said external surface of said drum to a predetermined electrical potential of given polarity; means for bringing a paper web into contact with the exposed dielectric surface of said drum for movement therewith; an image electrode movably mounted adjacent the exposed surface of said paper web for scanning said web in accordance with a preselected pattern; a signal source, coupled to said image electrode, for selectively energizing said image electrode to a polarity opposite said given polarity in accordance with the image values in an image to be reproduced to establish a charge image on said paper web; and means for flooding the exposed surface of said paper web with developer particles in the region immediately adjacent said image electrode to form on said paper web a physical image representative of said charge image substantially simultaneously with formation of said charge image.

3. A continuous direct-acting apparatus for the electrostatic reproduction of images comprising: a rotatable electrically conductive drum; means for rotating said drum at a predetermined speed; means for maintaining said drum at a predetermined electrical potential; means for bringing a paper web into contact with the external surface of said drum for movement therewith; an image electrode comprising a plurality of electrically conductive styli extending radially from a common axis and having a peripheral displacement approximately equal to the width of said paper web; means for rotating said image electrode about said axis to move said styli transversely of said web and scan said web in accordance with a preselected pattern; a signal source coupled to said image electrode for selectively energizing said image electrode to a predetermined polarity in accordance with the image values in an image to be reproduced to establish a charge image on said paper web; and means for flooding the exposed surface of said paper web with developer particles in the region immediately adjacent said image electrode to form on said paper web a physical image representative of said charge image substantially simultaneously with formation of said charge image.

4. A continuous direct-acting apparatus for the electrostatic reproduction of images comprising: a rotatable electrically conductive drum; means for rotating said drum at a predetermined speed; means for maintaining said drum at a predetermined electrical potential; means for bringing a paper web into contact with the external surface of said drum for movement therewith; an image electrode comprising a cylindrical member having an electrically conductive helical land projecting therefrom, the axial length of said helical land being approximately equal to the width of said paper web, said image electrode being mounted adjacent the paper-covered portion of said drum; means for rotating said image electrode about said axis to scan said web in accordance with a preselected pattern; a signal source coupled to said image electrode for selectively energizing said image electrode to a predetermined polarity in accordance with the image values in an image to be reproduced to establish a charge image on said paper web; and means for flooding the exposed surface of said paper web with developer particles in the region immediately adjacent said image electrode to form on said paper web a physical image representative of said charge image substantially simultaneously with formation of said charge image.

5. A continuous direct-acting apparatus for the electrostatic reproduction of images comprising: a rotatable electrically conductive drum; means for rotating said drum at a predetermined speed; means for maintaining said drum at a predetermined electrical potential of given polarity; means for bringing a paper web into contact with the external surface of said drum for movement therewith; an image electrode movably mounted adjacent the exposed surface of said paper web for scanning said web in accordance with a preselected pattern; a signal source, coupled to said image electrode, for selectively energizing said image electrode to a polarity opposite said given polarity in accordance with the image values in an image to be reproduced to establish a charge image on said paper web; and means for flooding a limited portion of the exposed surface of said paper web, in the region encompassing said image electrode, with developer particles having an electrostatic charge of said given polarity to form on said paper web a physical image representative of said charge image substantially simultaneously with formation of said charge image.

6. An image-reproducing apparatus comprising means for moving a dielectric image-receiving surface past an imaging station, means for applying an electroscopic powder or developer to said surface at a given location to develop an electrostatic image on said surface into a physical image, and an image electrode for forming an electrostatic image on said surface at said given location, said electrode comprising a plurality of electrically conductive electrically interconnected styli mounted for rotation about a common axis and having a uniform peripheral radial spacing approximately equal to the effective width of said dielectric surface taken in a direction transverse to the direction of movement thereof.

7. An image-reproducing apparatus comprising means for moving a dielectric image-receiving surface past an imaging station, means for applying an electroscopic powder or developer to said surface at a given location to develop an electrostatic image on said surface into a physical image, and an image electrode for forming an electrostatic image on said surface at said given location, said image electrode comprising a rotatably mounted hub member, a plurality of electrically conductive styli mounted in equiangular distribution about said hub for rotation therewith and having a uniform peripheral radial spacing approximately equal to the effective width of said dielectric surface transverse to the direction of movement thereof, said styli being mounted for relatively limited motion with respect to said hub, and means electrically interconnecting all of said styli.

8. An image-reproducing apparatus comprising means for moving a dielectric image-receiving surface past an imaging station, means for applying an electroscopic powder or developer to said surface at a given location to develop an electrostatic image on said surface into a physical image, and an image electrode for forming an electrostatic image on said surface at said given location, said image electrode comprising a rotatably mounted hub member, a plurality of electrically conductive styli mounted in equiangular distribution about said hub and extending radially therefrom for rotation therewith and having a uniform peripheral radial spacing approximately equal to the effective width of said dielectric surface transverse to the direction of movement thereof, said styli being mounted for relatively limited radial motion with respect to said hub, and means electrically interconnecting all of said styli.

9. An image-reproducing apparatus comprising means for moving a dielectric image-receiving surface past an imaging station, means for applying an electroscopic powder or developer to said surface at a given location to develop an electrostatic image on said surface into a physical image, and an image electrode for forming an electrostatic image on said surface at said given location, said image electrode comprising a rotatably mounted hub member, a plurality of electrically conductive styli mounted in equiangular distribution about said hub and extending substantially parallel to the axis of rotation of said hub for rotation therewith and having a uniform peripheral radial spacing approximately equal to the effective width of said dielectric surface transverse to the direction of movement thereof, said styli being mounted for relatively limited axial motion with respect to said hub, and means electrically interconnecting all of said styli.

10. An image-reproducing apparatus comprising means for moving a dielectric image-receiving surface past an imaging station, means for applying an electroscopic powder or developer to said surface at a given location to develop an electrostatic image on said surface into a physical image, and an image electrode for forming an electrostatic image on said surface at said given location, said image electrode comprising a cylindrical base member mounted for rotation about an axis extending transversely of said dielectric surface and a conductive helical land projecting from said cylindrical member into point contact with said dielectric surface, said helical conductive land having an axial length approximately equal to the effective width of said dielectric surface in a direction transverse to the direction of movement of said surface.

References Cited in the file of this patent

UNITED STATES PATENTS

| | | |
|---|---|---|
| 1,697,932 | Schnitzeler | Jan. 8, 1929 |
| 1,825,551 | Serrell | Sept. 29, 1931 |
| 2,003,680 | De Forest | June 4, 1935 |
| 2,063,992 | Elsey | Dec. 15, 1936 |
| 2,245,286 | Marzocchi | June 10, 1941 |
| 2,572,550 | White et al. | Oct. 23, 1951 |
| 2,573,881 | Walkup | Nov. 6, 1951 |
| 2,575,742 | Blatin et al. | Nov. 20, 1951 |
| 2,716,048 | Young | Aug. 23, 1955 |
| 2,725,304 | Landrigan et al. | Nov. 29, 1955 |
| 2,758,939 | Sugarman | Aug. 14, 1956 |
| 2,771,336 | MacGriff | Nov. 20, 1956 |
| 2,777,745 | McNaney | Jan. 15, 1957 |
| 2,830,114 | Carlson | Apr. 8, 1958 |

FOREIGN PATENTS

| | | |
|---|---|---|
| 462,156 | Germany | July 5, 1928 |